Figure 1:
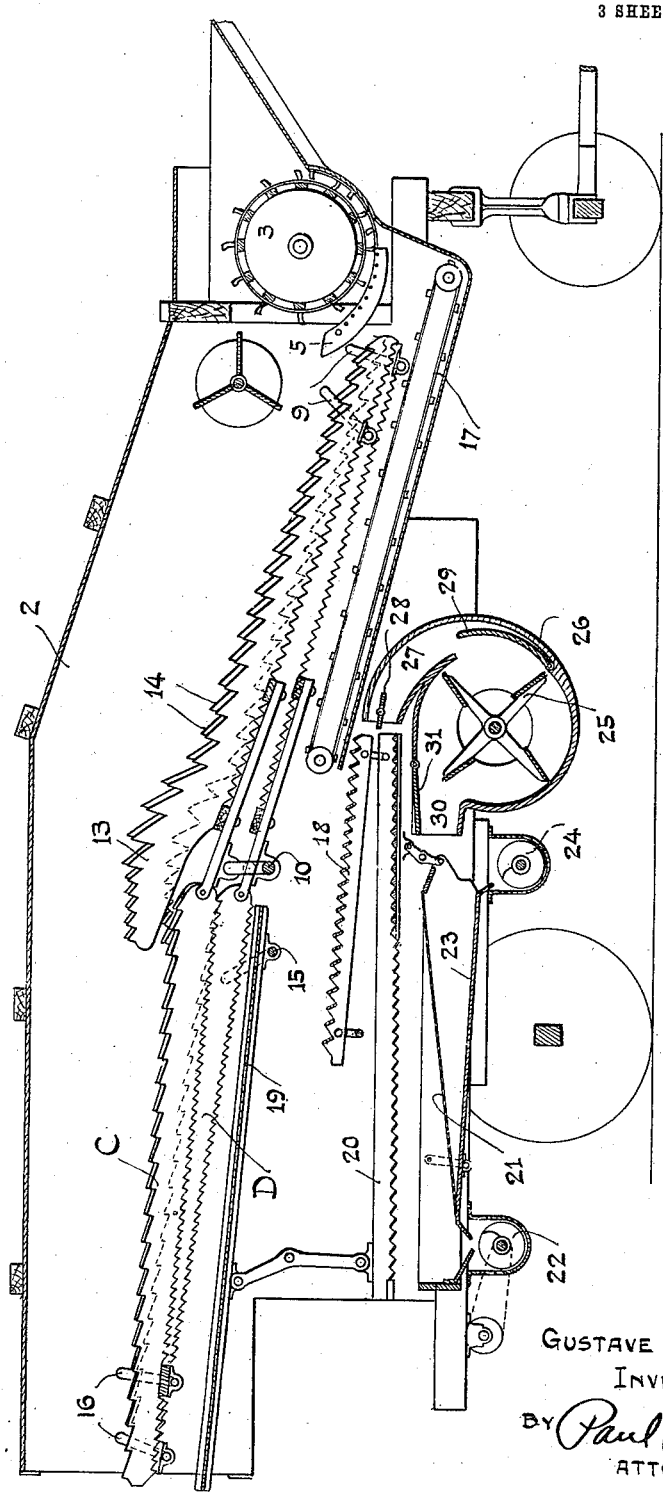

G. SIPLER.
THRESHING MACHINE.
APPLICATION FILED FEB. 2, 1909.

976,306.

Patented Nov. 22, 1910.

3 SHEETS—SHEET 1.

WITNESSES

GUSTAVE SIPLER
INVENTOR
BY Paul & Paul
ATTORNEYS

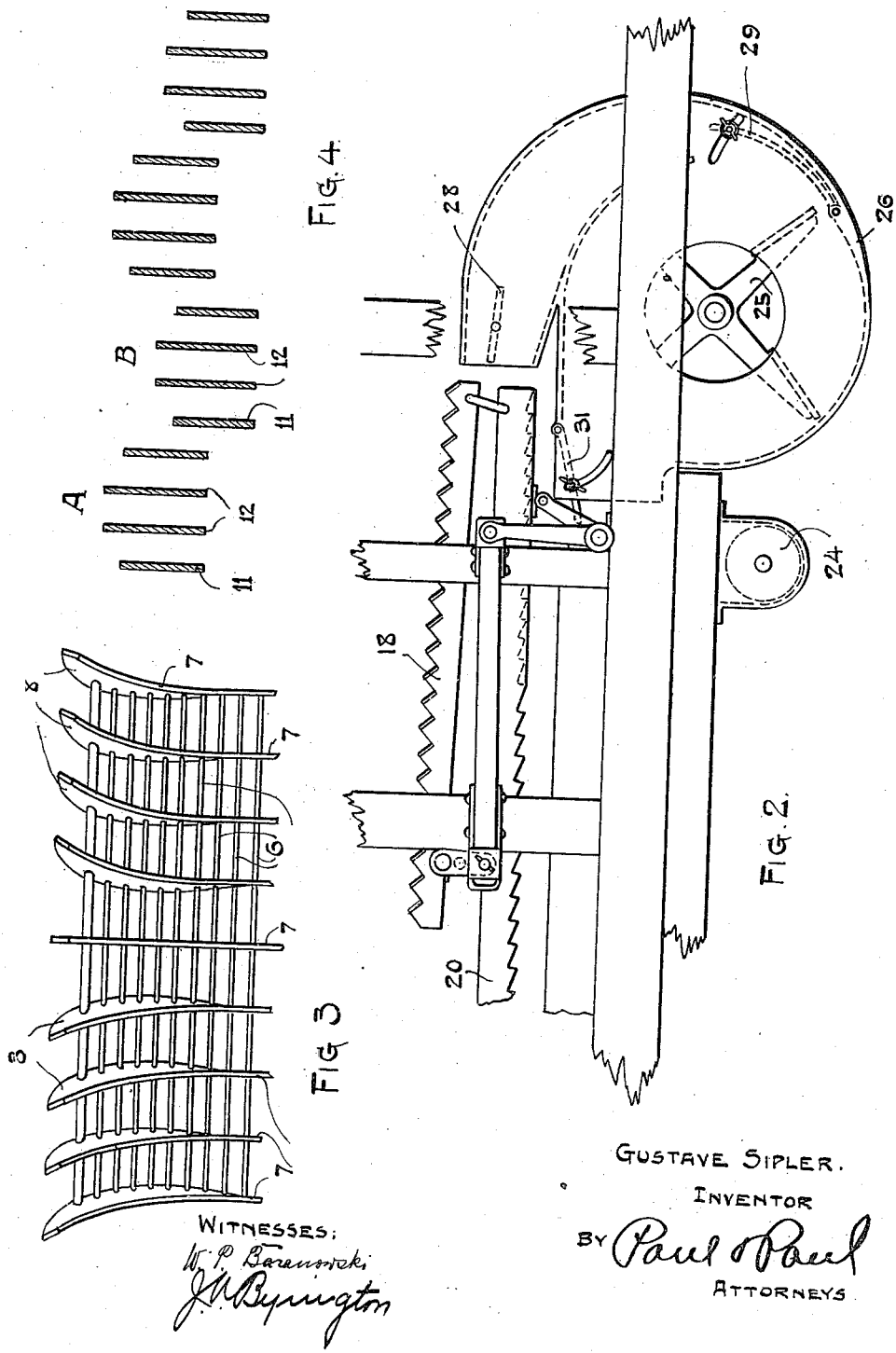

G. SIPLER.
THRESHING MACHINE.
APPLICATION FILED FEB. 2, 1909.
976,306.
Patented Nov. 22, 1910.
3 SHEETS—SHEET 3.
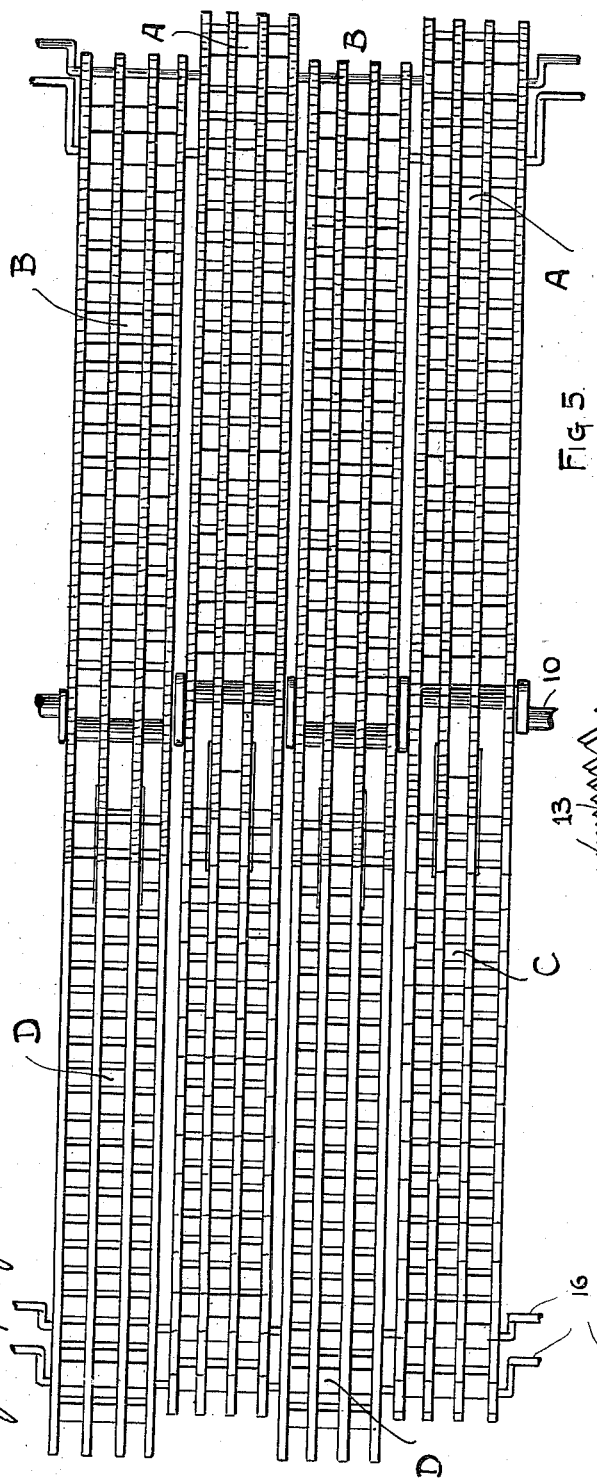
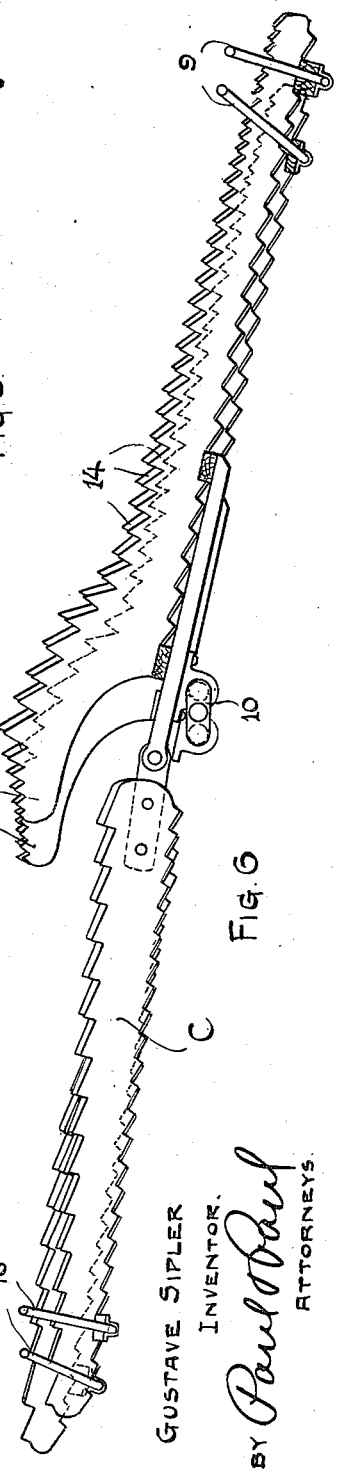
WITNESSES:
GUSTAVE SIPLER
INVENTOR.
BY
ATTORNEYS.

UNITED STATES PATENT OFFICE.

GUSTAVE SIPLER, OF MINNEAPOLIS, MINNESOTA.

THRESHING-MACHINE.

976,306.   Specification of Letters Patent.   Patented Nov. 22, 1910.

Application filed February 2, 1909. Serial No. 475,588.

*To all whom it may concern:*

Be it known that I, GUSTAVE SIPLER, of Minneapolis, Hennepin county, Minnesota, have invented certain new and useful Improvements in Threshing-Machines, of which the following is a specification.

The object of my invention is to provide a threshing machine having means for effecting a more perfect separation of the straw and grain, imparting as it does, a thorough agitation of the straw as it leaves the threshing cylinder and moves over the racks.

The invention consists generally in an improved straw rack, as herein described and claimed.

In the accompanying drawings, forming part of this specification, Figure 1 is a longitudinal, vertical, sectional view of a threshing machine embodying my invention, Fig. 2 is a sectional view illustrating in detail the arrangement of the chaffers and air blast apparatus, Fig. 3 is a detail view of the spreader device located on the discharge side of a threshing cylinder. Fig. 4 is a transverse sectional view through the sections of the straw rack, Fig 5 is a plan view of the straw rack, Fig. 6 is a side view of the straw rack, illustrating the arrangement of the sections and the means for agitating and thoroughly shaking up the straw.

In the drawing, 2 represents the casing, 3 the threshing cylinder, 4 the concaves, and 5 a spreader located on the discharge side of the threshing cylinder. This spreader is composed of longitudinally arranged rods 6 having a series of blades 7 arranged on each side of the transverse center of the spreader and provided with outwardly turned ends 8, which engage the straw as it leaves the threshing cylinder and spreads it outwardly toward the sides of the casing. The straw rack, which I employ in this apparatus, is composed of a series of sections arranged side by side supported at their ends contiguous to the threshing cylinder upon links 9, and at their opposite ends upon a crank shaft 10.

Each section, which I will designate by reference letters A. and B., is composed of a series of bars, preferably four in number, arranged side by side with spaces between them, the outer bars 11 having their upper edges below the corresponding edges of the middle bars 12, so that the upper surfaces of the sections will be crowning or convex in shape and the straw passing thereover will be bent downwardly at the sides of the sections and raised in the middle and the off sets in the crank shaft 10, on which the sections are supported, will cause them to be raised and lowered alternately and present an uneven upper surface, as indicated in Fig. 4. That is, as one section moves downwardly, the adjoining one will be raised and the straw moving thereon, will be broken and agitated to such an extent that the grain mixed with the straw will be thoroughly shaken out. The inner ends of the bars of the side sections are provided with raised portions 13 and teeth 14 are formed on these raised portions and also on the upper edges of the side bar sections and these teeth engaging the straw, will feed it backwardly away from the threshing cylinder. This tooth arrangement I do not regard as broadly new. A second series of rack sections are provided to form a continuation of the first series and consists of sections C. and D. supported on a crank shaft 15, the bars of the sections corresponding to those described substantially, and I will indicate them by the same reference numerals. Links 16 support the outer ends of the rack bar sections and as indicated in Fig. 1, the inclination of these sections is different from those of the sections adjoining the threshing cylinder, for while the sections nearest the cylinder are inclined upwardly therefrom and tend to raise the sheet of straw as it moves over the rack, the next series of racks are inclined a little in the opposite direction, thus changing the direction of movement of the straw and causing a more thorough shaking of it to separate the grain than would be the case where a straight, continuous rack was employed. The sections of the second series of rack bars are arranged to move up and down alternately in the same manner as those described, except that they may be timed to move either in advance or behind the first set of bars. A conveyer belt 17 is located beneath the forward set of rack bars and receives the loose grain therefrom and the fine material mixed therewith and delivers it to a chaffer 18 that is suspended between the walls of the casing beneath the middle portion of the rack. The grain pan 19 is located beneath the second series of rack bars and deposits the material therefrom upon the chaffer 18. Under this chaffer is a second chaffer 20, beneath which I provide a sieve 21 that is arranged to discharge the material falling thereon to a transverse carrier 22, which discharges the material collected thereby into an elevator (not shown). A pan 23 beneath the sieve 21 receives the grain therefrom and delivers it to a transverse grain conveyer 24.

A blast fan 25 is located within the casing 26 beneath and in front of the chaffers. This casing has an air trunk 27 leading to a point near the forward ends of the chaffers in position to deliver a blast of air between them. This air blast is controlled by a valve 28 and a valve 29 controls the admission of air from the casing of the blast fan into the trunk 27. The casing 26 also has a discharge throat 30 leading to a point beneath the chaffer 20 and is provided with a valve 31, by means of which the size of this opening or throat can be regulated. I am thus able, with a single blast fan, to direct two currents of air, one through and between the chaffers and another under the lower chaffer and thus utilize two chaffers, one above another, and increase the separating surface, without increasing the length of the machine casing and without employing two fans. By means of the valves, I am able to very nicely control the air currents, delivering the proper volume to each chaffer and I have found that I can effect a very complete separation of the tailings at this point and deliver the grain to the sieve beneath with practically all the chaff and light material eliminated therefrom.

I claim as my invention:

1. In a threshing machine a straw rack composed of groups of sections placed end to end, there being a group contiguous to the cylinder and a second group forming a continuation of said first named group, each group consisting of a series of sections and each section being composed of a series of bars arranged in parallel relation with one another, the ends of the bars in the sections of one group being upwardly curved and overhanging the adjoining ends of the sections in the adjacent group, and said upwardly curved ends having crowning toothed edges and the teeth of said crowning portion being inclined at a greater angle to the horizontal than the teeth of the remaining portions of said bars, and the teeth at the ends of said crowning portions being shorter than those at the middle portions thereof, whereby an increased shaking of the straw will result.

2. In a threshing machine, a straw rack composed of groups of sections placed end to end, there being a group contiguous to the cylinder, and a second group forming a continuation of said first named group, each group consisting of a series of sections, and each section being composed of a series of bars arranged in parallel relation with one another, the ends of the bars in the sections of one group being upwardly curved and overhanging the contiguous ends of the sections in the adjoining group, and said upwardly curved ends having crowning toothed edges arranged on different levels across the rack, the teeth of said crowning edges being inclined to the horizontal at a greater angle than the teeth of the remaining portions of said bars.

In witness whereof, I have hereunto set my hand this 22d day of January 1909.

GUSTAVE SIPLER.

Witnesses:
RICHARD PAUL,
J. A. BYINGTON.